United States Patent
Bennett

(10) Patent No.: US 7,752,533 B2
(45) Date of Patent: Jul. 6, 2010

(54) SYSTEMS AND METHODS FOR IMPROVING RADIO FREQUENCY SIGNAL RECEPTION

(75) Inventor: William G. Bennett, Vista, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 848 days.

(21) Appl. No.: 11/391,974

(22) Filed: Mar. 28, 2006

(65) Prior Publication Data
US 2007/0236600 A1    Oct. 11, 2007

(51) Int. Cl.
G06F 7/02 (2006.01)
(52) U.S. Cl. .................. 714/819; 455/570; 370/286; 370/287; 370/289; 370/290
(58) Field of Classification Search ............ 714/819; 375/260, 324; 370/286, 287, 289, 290; 455/570
See application file for complete search history.

(56) References Cited

U.S. PATENT DOCUMENTS

| | | | |
|---|---|---|---|
| 5,283,531 | A | 2/1994 | Serizawa et al. |
| 6,384,858 | B1 | 5/2002 | Limberg |
| 6,900,828 | B2 | 5/2005 | Ramaswamy et al. |
| 2002/0077536 | A1 | 6/2002 | Diab et al. |
| 2002/0159543 | A1* | 10/2002 | Perlow et al. ............. 375/324 |
| 2002/0163593 | A1* | 11/2002 | Liu et al. ............... 348/614 |
| 2003/0072363 | A1 | 4/2003 | McDonald et al. |
| 2004/0042571 | A1 | 3/2004 | Bouillet |
| 2004/0193997 | A1 | 9/2004 | Gallezot et al. |
| 2005/0180558 | A1* | 8/2005 | Zhang .................. 379/406.1 |
| 2005/0249300 | A1 | 11/2005 | Jeong et al. |
| 2006/0033846 | A1 | 2/2006 | Ozaki et al. |

FOREIGN PATENT DOCUMENTS

EP    1246458    10/2002

OTHER PUBLICATIONS

International Search Report and Written Opinion, Aug. 26, 2008.

* cited by examiner

Primary Examiner—Sam Rizk
(74) Attorney, Agent, or Firm—Dickstein Shapiro LLP

(57) ABSTRACT

A demodulator cancels out the echo signal properties in the received signal to generate a primary signal, and cancels out the primary signal properties in the received signal to generate a separate echo signal. In addition, the demodulator may combine the primary signal and the echo signal in a comparison/combination operation to generate a third combined signal. Error correction operations may then be performed on all three of the primary signal, echo signal and combined signal, with the results of those error correction operations being used to select which of the three signals will serve as the transport stream.

23 Claims, 3 Drawing Sheets

SYSTEMS AND METHODS FOR IMPROVING RADIO FREQUENCY SIGNAL RECEPTION

1. FIELD OF THE INVENTION

The invention relates in general to radio frequency signals, and in particular to improving radio frequency signal reception by demodulating both primary and secondary signals.

2. BACKGROUND

The ATSC (Advanced Television Systems Committee) developed standards for digital television (DTV) that specify technologies for the transport, format, compression, and transmission of DTV in the United States. For example, so-called "8VSB" is the 8-level vestigial sideband modulation method adopted for terrestrial broadcast of the ATSC digital television standard in the United States and Canada. In the 6 megahertz channel used for broadcasting ATSC, 8VSB carries 19.39 megabits of usable data per second, although the actual transmitted bit rate is significantly higher due to the addition of forward error correction codes. The eight signal levels are selected with the use of a trellis encoder. There are also the similar modulations 2VSB, 4VSB, and 16VSB. 16VSB was notably intended to be used for ATSC digital cable, but quadrature amplitude modulation (QAM) has become the industry standard instead.

ATSC receivers synchronize their operations to a primary signal, and the primary signal is usually the direct signal received over the shortest transmission path. However, so-called multipath signals may similarly be received over other paths that are typically delayed with respect to the primary signal and materialize as lagging echo signals. Echoes signals vary in number, amplitude and delay time from location to location and from channel to channel at a given location.

The presence of echo signals in a multipath environment materially affects the ability of radio frequency receivers, such as ATSC receivers, to properly receive and decode the primary signal. Given that many radio frequency signals can be corrupted by multipath signals, extensive hardware has been developed to cancel out the lesser multipath signals. However, such echo canceling hardware is not always completely successful and signal quality can suffer as a consequence. As such, what is needed is a system and method for improving radio frequency signal reception.

BRIEF SUMMARY OF THE INVENTION

Disclosed and claimed herein are systems and methods for improved radio frequency signal reception. In one embodiment, a method for demodulating a received signal includes canceling echo signal properties in the received signal to generate a primary signal, canceling primary signal properties in the received signal to generate an echo signal, and combining the primary signal and the echo signal to generate a combined signal. The method further includes performing error correction operations on the primary signal, echo signal and combined signal, and selecting one of the primary signal, echo signal and combined signal based on a result of the error correction operations performed.

Other aspects, features, and techniques of the invention will be apparent to one skilled in the relevant art in view of the following detailed description of the invention.

DETAILED DESCRIPTION OF THE PREFERRED EMBODIMENT

Figure 1:
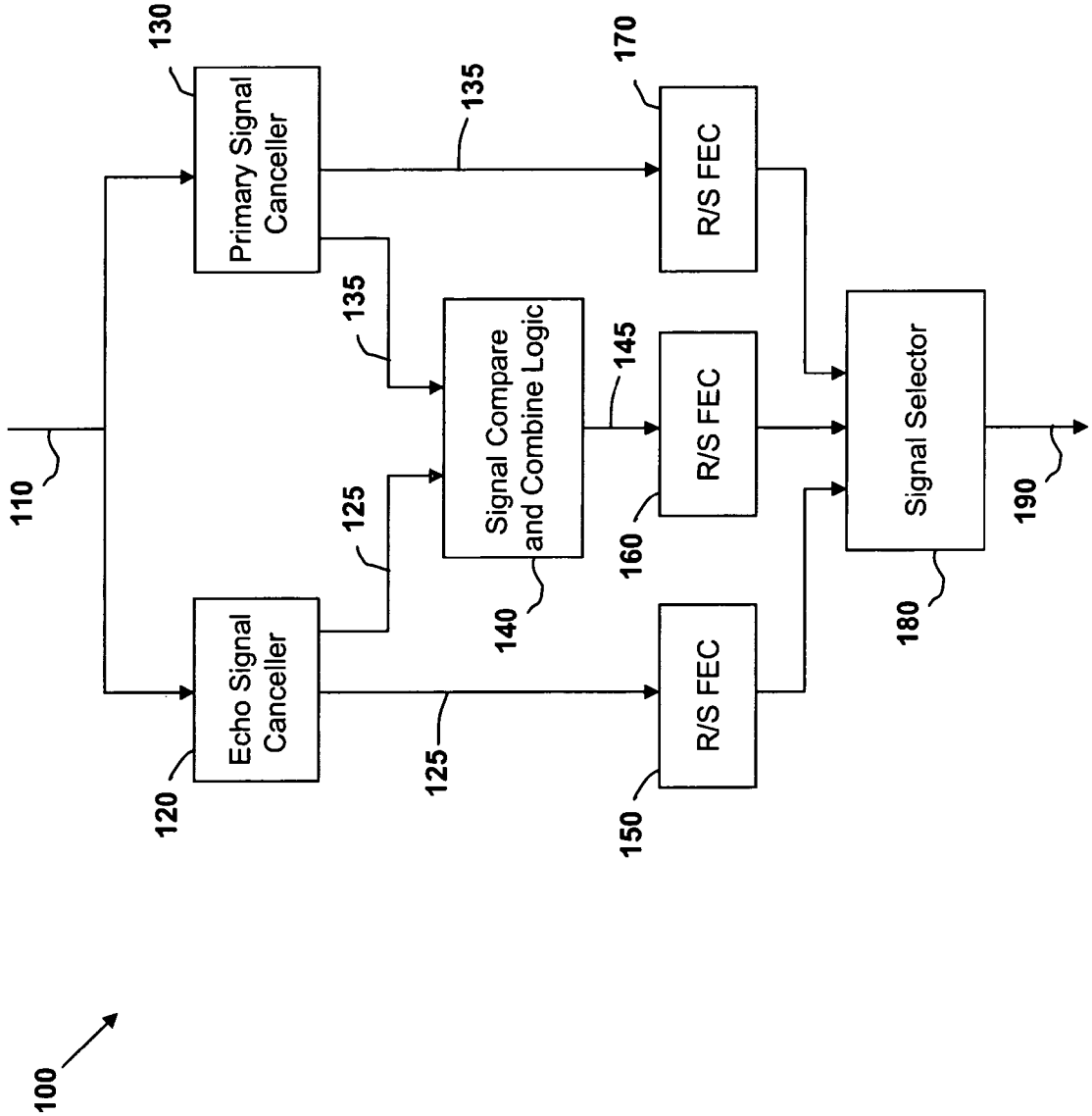
FIG. 1 is a simplified schematic of a demodulator configured in accordance with one embodiment of the invention.

One aspect of the invention is to provide a demodulator for a received signal, such as an ATSC digital signal. In one embodiment, the demodulator cancels out the echo signal properties in the received signal to generate a primary signal, and cancels out the primary signal properties in the received signal to generate a separate echo signal. In addition, the demodulator may combine the primary signal and the echo signal in a comparison/combination operation to generate a third combined signal. Error correction operations may then be performed on all three of the primary signal, echo signal and combined signal, with the results of those error correction operations being used to select which of the three signals will serve as the transport stream. In one embodiment, this selection process is continuous and dynamic and ensures that the demodulator's transport stream is made up of the highest quality signal available. In one embodiment, the received signal is one of an intermediate frequency ATSC signal or a QAM signal which is converted from analog to digital prior to being demodulated.

In one embodiment, the demodulator generates the combined signal by performing a bit-by-bit comparison of the primary signal and the echo signal, and selecting bits from one of the two signals based on a result of said bit-by-bit comparison. The combined signal may then be formed using the selected bits. In one embodiment, the result of the bit-by-bit comparison is a confidence level determined from sampling a margin of the primary signal and echo signal.

Another aspect of the invention is to perform the aforementioned error correction operation using Reed-Solomon forward error correction modules for each of the primary signal, echo signal and combined signal.

As used herein, the terms "a" or "an" shall mean one or more than one. The term "plurality" shall mean two or more than two. The term "another" is defined as a second or more. The terms "including" and/or "having" are open ended (e.g., comprising). The term "coupled" means connected to, although not necessarily directly, and not necessarily mechanically. The term "program," "computer program," and similar terms means a sequence of instructions designed for execution on a computer system. This may include subroutines, functions, procedures, object methods, object implementations, an executable application, applets, servlets, source code, object code, shared library/dynamic load library and/or other sequence of instructions designed for execution on a computer system.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

FIG. 1 is a simplified block diagram of one embodiment of a demodulator 100 configured in accordance with the invention. After being received, a radio frequency signal is down-converted to an intermediate frequency (IF) signal 110 by a tuner (not shown). In one embodiment, the signal is an ATSC signal, such as an 8Vsb signal. After being passed through an analog-to-digital converter (not shown), signal 110 is provided to both an echo signal canceller 120, as well as a primary signal canceller 130. As will be described in more detail below with reference to FIG. 2, the echo signal canceller 120 functions as an equalizer to isolate the primary signal being received by canceling or otherwise eliminating all secondary or echo signals. In contrast, the primary signal canceller 130 equalizes out the primary signal, thus leaving only the echo or multipath signal(s).

From the echo canceller 120, an echo-free primary signal 125 is provided to an error correction block, such as the Reed-Solomon forward error correction (FEC) block 150. Similarly, the primary signal canceller 130 provides the now-isolated echo signal 135 to a separate FEC block 170. In addition, each of the echo signal canceller 120 and primary signal canceller 130 provides their respective output signals (i.e, primary signal 125 and echo signal 135) to signal combiner logic 140. As will be described in more detail below, logic 140 may be used to perform a bit-by-bit comparison and combination of the primary signal 125 and the echo signal 135. In one embodiment, the result of this combination operation is combined signal 145, which may then in turn be provided to yet another FEC block 160.

As is generally known, Reed-Solomon error correction is a coding scheme which works by first constructing a polynomial from the data symbols to be transmitted and then sending an oversampled plot of the polynomial instead of the original symbols themselves. Because of the redundant information contained in the oversampled data, it is possible to reconstruct the original polynomial and thus the data symbols even in the face of transmission errors, up to a certain degree of error. While FEC blocks 150, 160 and 170 have been described in terms of the Reed-Solomon coding scheme, it should equally be appreciated that any other error correction scheme may be used which quantifies or signal quality, or from which one can otherwise derive a representation of signal quality.

In the embodiment of FIG. 1, the signal selector 180 receives packets of data from each of the aforementioned FEC blocks 150, 160 and 170. The signal selector 180 determines which packets of data from the three streams of data will be output as transport stream 190 and out of demodulator 100. In one embodiment, the selection or voting process is based on monitoring a Reed-Solomon FEC flag produced by each of the three FEC blocks 150, 160 and 170. In another embodiment, the voting process is driven by a determination of which signal 125, 135 or 145 has the fewest errors. In this fashion, the signal selector 180 may function as a packet multiplexer that outputs, on a continuous basis, which ever of the three data streams has been determined to have the fewest errors. That is, just because a signal is an echo or multipath signal does not necessarily mean that it contains more errors than the primary signal. Thus, by utilizing the echo signals when primary signal quality is low, overall signal reception and demodulation may be improved.

Figure 2:
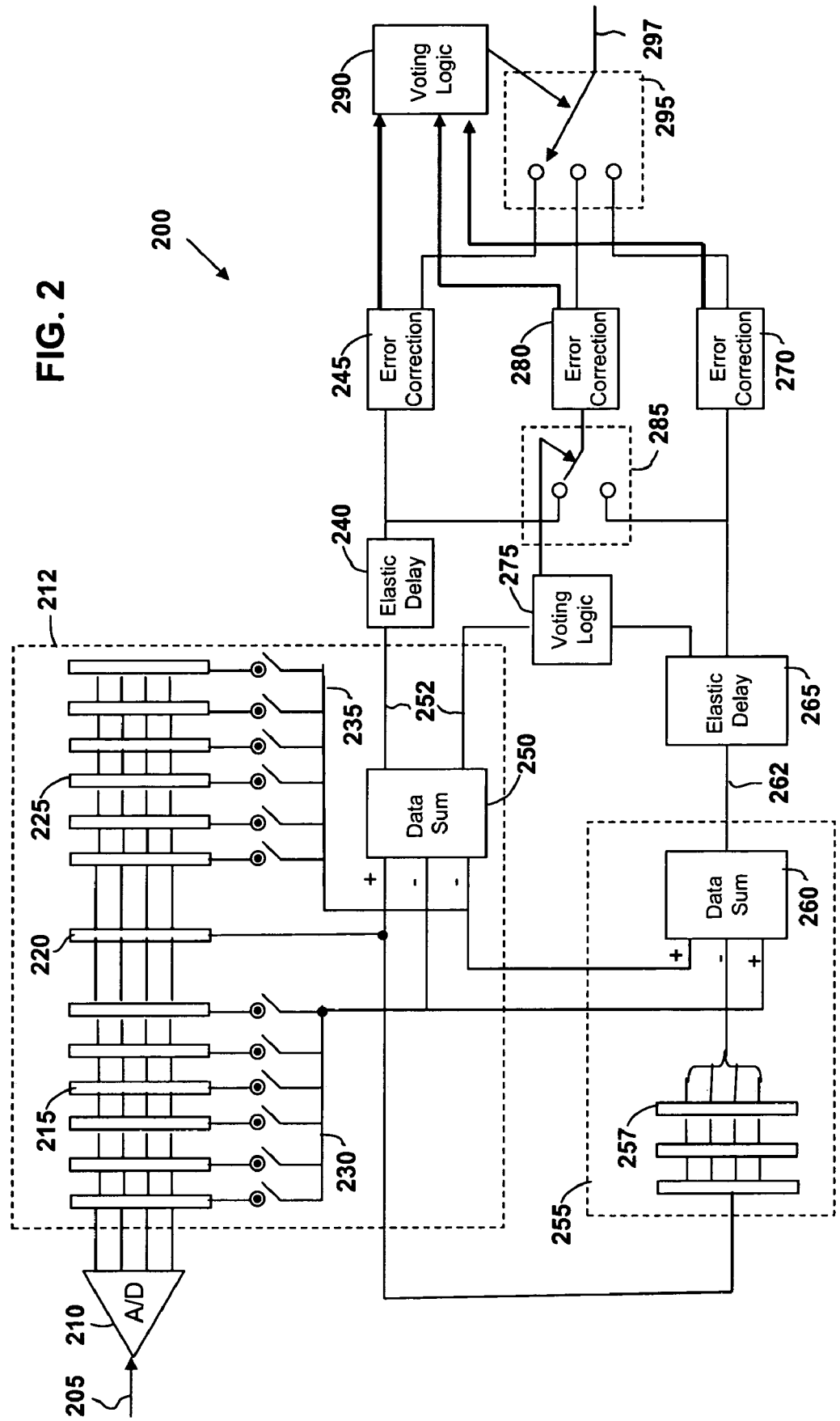
FIG. 2 is a more detailed schematic of a demodulator configured in accordance with the principles of the invention.

Referring now to FIG. 2, depicted is a more detailed embodiment of a demodulator 200 configured in accordance with the principles of the invention. Although not shown, it should be appreciated that demodulator 200 may be preceded or followed by any number of additional signal processing components, such as band pass filters, amplifiers and/or mixers. In addition, additional internal FEC blocks and de-interleavers may be included, the details of which are beyond the scope of this disclosure.

In the embodiment of FIG. 2, demodulator 200 receives an RF signal 205 (e.g., a down-converted intermediate frequency signal), which is then provided to analog-to-digital converter 210. Once converted into a digital data stream, signal 205 is provided to a echo signal canceller block 212. In one embodiment, the echo signal canceller 212 is comprised of a post-echo delay cell 215, a primary tap 220, a pre-echo delay cell 225, tap selectors 230 and 235 and a data summer 250. The echo signal canceller block 212 is usable to isolate the primary properties in IF signal 205 by canceling out the echo signal properties.

In one embodiment, the echo canceller block 212 functions by having the digital samples from signal 205 clocked through the post-echo delay cell 215 and then to primary tap 220. The digital samples continue from the primary tap 220 to the pre-echo delay cell 225, as shown in FIG. 2. Samples from all three of the post-echo delay cell 215, primary tap 220, and pre-echo delay cell 225 may then be sent to the data summer 250. The data summer 250 drives tap selectors 230 and 235 based on an algorithm to access the digital values from the incoming signal 205 that are then mixed to create virtually echo free data output in the form of primary signal 252.

It should be appreciated that the tap selection process may be implemented using numerous embodiments of the tap selection algorithm. By way of a non-limiting example, in one embodiment a field sync, which is a known pattern, is used to manipulate the taps until a match is found. After the taps are set to receive the field sync, minor adjustments may be made dynamically to minimize the error between the known levels (e.g., 8 for 8vsb) and the digital sample (e.g., 2048 for an 11-bit sample). In other embodiments, more or fewer bits could be used in the digital sample. This tap selection process converges the data so that the MSB's reflect the 8 data levels sent, and the LSB's reflect the divergence away from optimal that the equalizer tries to optimize.

Continuing to refer to FIG. 2, demodulator 200 is further equipped with a primary signal canceller block 255 comprised of a delay equalizer 257 and data summer 260. In one embodiment, the delay equalizer 257 and data summer 260 function to cancel the primary signal properties out of the received signal 205, and recover at least one of the secondary echo signals. In one embodiment, the primary signal canceller 255 outputs echo signal 262, which is essentially the signal being cancelled by the previously-described echo signal canceller 212. Similarly, the primary signal 252 may represent the signal being cancelled by the primary signal canceller 255.

Elastic delay logic 240 and 265 may be used to accelerate or retard the rate at which the primary signal 252 and echo signal 262 are provided to their respective error correction blocks 245 and 270, respectively. In one embodiment, elastic delay logic 240 and 265 enable the synchronization of the three signals across the three error correction blocks 245, 270 and 280. It should be appreciated that elastic delay logic 240 and 265 may be placed in other locations within demodulator 200 and achieve the same result of aligning the data packets for synchronous switching of the output packets.

In the embodiment of FIG. 2, demodulator 200 may analyze three different signals in order to isolate and transport the least error-containing signal. These three signals include the primary signal, the echo signal 262 and a third signal derived from a combination of the primary signal 252 and the echo signal 262. In one embodiment, this combination signal is based on a bit-by-bit combination of the primary signal 252 and echo signal 262. This combination process may be performed by voting logic 275 sampling the margin of the input signals (i.e., primary signal 252 and echo signal 262) and selecting the signal with the highest confidence. As shown in FIG. 2, voting logic 275 drives switch 285 to provide the higher confidence signal to error correction block 280. In this fashion, error correction is performed by block 280 on a combination signal. Since the minimum decision level's for 8vsb detection is only about 3 bits and digital demodulators typically have 10 to 11 bit analog-to-digital converters, this over resolution can be used as an indication of the margin from the expected level to the detected level. This margin is therefore in essence a confidence level of how likely it is that the signal does not contain errors.

As previously mentioned, elastic delay logic 240 and 265 may be used to synchronize the three signals being provided to the three error correction blocks 245, 270 and 280. In another embodiment, an additional optional elastic delay block (not shown) may be used to buffer the combination signal provided to error correction block 280. Regardless of the arrangement used to synchronize the signals, the voting logic 290 receives and evaluates the three signals provided to it by the three error correction blocks 245, 270 and 280. The signal exhibiting the highest probability of being correct may then be used as the transport stream 297 out of the demodulator 200 by controlling switch 295. In one embodiment, this voting process is based on monitoring the forward error correction flags for the three incoming signals and making the appropriate selection. In one embodiment, as one of the signal samples diverges from the optimal value, one of the other signal samples having a higher probability of being correct may be substituted in place thereof.

Figure 3:
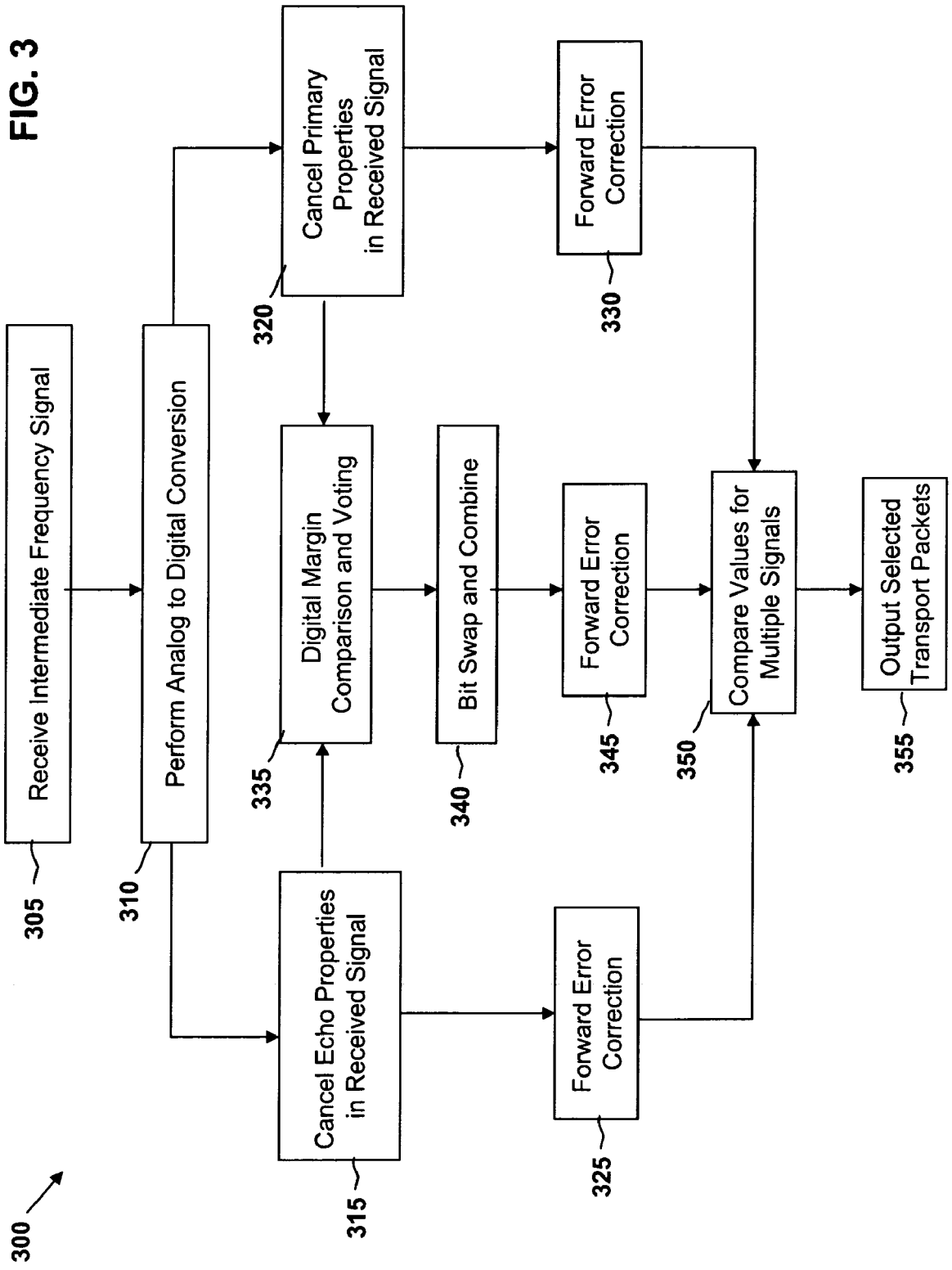
FIG. 3 is one embodiment of a flow diagram of a process for carrying out one or more aspects of the invention.

FIG. 3 is a simplified process diagram for one embodiment of the invention. In this embodiment, process 300 begins with the reception of an IF signal at block 305, followed by an analog-to-digital conversion operation at block 310. It should equally be appreciated that the operations of block 305 and 310 may be performed prior to, and not as part of, process 300. In any case, the resulting digital signal is then provided to both blocks 315 and 320.

At block 315, the received digital signal is processed to cancel any echo or multipath properties that it may have. Simultaneously therewith, the received signal is processed at block 320 to cancel the primary signal properties, thereby leaving only an echo or multipath signal(s). In one embodiment, the operation of block 315 may be performed by an echo signal canceller (e.g., echo signal canceller 120), while the operation of block 320 may be performed by a primary signal canceller (e.g., primary signal canceller 130).

Process 300 continues at block 335 with the comparison of the output from block 315 to the output from block 320. In one embodiment, the output from the operation performed at block 315 is an echo-free primary signal (e.g., primary signal 252), while the output from the operation of block 320 is a pure echo signal (e.g., echo signal 262). In one embodiment, this comparison is performed by sampling the margin of these two output signals and selecting the signal with the highest confidence. A bit-by-bit combination of the two signals may then be completed at block 340 with the combined signal then being processed at block 350, as shown in FIG. 3.

In one embodiment, error correction processing is implemented at each of blocks 325, 330 and 345 simultaneously on three different signals. In the case of block 325, error correction measures are performed on a primary signal. In the case of block 330, error correction measures are performed on an echo signal, while in the case of block 345, error correction may be performed on the combined signal resulting from the bit-by-bit combination performed at block 340.

While in one embodiment the error correction measures performed at blocks 325, 330 and 345 are based on Reed-Solomon FEC, it should equally be appreciated that other error correction schemes may be used which quantify or otherwise provide a value representative of the quality of the received signal.

Continuing to refer to FIG. 3, process 300 continues to block 350 where error correction information is received from the operations performed at blocks 325, 330 and 345, respectively. Based on the results of this comparison, one of the three signals is selected as the output transport signal at block 355. In one embodiment, the signal selection operation of block 355 is based on monitoring a Reed-Solomon FEC flag for each of the three signals. In another embodiment, the voting process is driven by a determination of which signal of the three signals has the fewest errors. In this fashion, process 300 may improve the overall signal quality output from a demodulator.

While certain of the above exemplary embodiments are based upon use of a programmed processor, the invention is not limited to such exemplary embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A method for demodulating a received signal comprising:
    canceling echo signal properties in the received signal to generate a primary signal;
    canceling primary signal properties in the received signal to generate an echo signal;
    combining the primary signal and the echo signal to generate a combined signal;
    performing error correction operations on each of the primary signal, echo signal and combined signal; and
    selecting one of the primary signal, echo signal and combined signal based on a result of said error correction operation.

2. The method of claim 1, wherein the received signal is an intermediate frequency ATSC digital signal.

3. The method of claim 1, wherein combining the primary signal and echo signal comprises:
    performing a bit-by-bit comparison of the primary signal and the echo signal; and
    selecting bits from one of said primary signal and echo signal based on a result of said bit-by-bit comparison;
    generating the combined signal based on said selecting.

4. The method of claim 3, wherein said result is a confidence level determined from sampling a margin of the primary signal and echo signal.

5. The method of claim 1, wherein performing the error correction operations comprises performing Reed-Solomon forward error correction operations on each of the primary signal, echo signal and combined signal.

6. The method of claim 1, wherein, prior to said selecting, the method further comprises evaluating the primary signal, echo signal and combined signal to determine which has the highest probability of being correct.

7. The method of claim 6, wherein evaluating comprises monitoring one or more forward error correction flags generated during said error correction operations.

8. The method of claim 1, further comprising outputting a selected one of the primary signal, echo signal and combined signal as a transport stream.

9. The method of claim 1, wherein selecting one of the primary signal, echo signal and combined signal further selecting one of the primary signal, echo signal and combined signal on a continuous basis during said demodulating the received signal.

10. A method for demodulating a received signal comprising:
  equalizing the received signal to generate a primary signal;
  equalizing the received signal to generate an echo signal;
  generating a combined signal based on said primary signal and echo signal;
  performing error correction operations on each of the primary signal, echo signal and combined signal; and
  selecting one of the primary signal, echo signal and combined signal to be a transport stream based on said error correction operations.

11. The method of claim 10, wherein generating the combined signal comprises:
  performing a bit-by-bit comparison of the primary signal and the echo signal; and
  selecting bits from one of said primary signal and echo signal based on a result of said bit-by-bit comparison;
  generating the combined signal based on said selecting.

12. The method of claim 10, wherein performing the error correction operations comprises performing Reed-Solomon forward error correction operations on each of the primary signal, echo signal and combined signal.

13. The method of claim 10, wherein, prior to said selecting, the method further comprises:
  monitoring one or more forward error correction flags generated during said error correction operations; and
  evaluating the one or more forward error correction flags to determine which of the primary, echo and combined signals has the highest probability of being correct.

14. The method of claim 9, further comprising outputting a selected one of the primary signal, echo signal and combined signal as a transport stream.

15. The method of claim 10, wherein selecting one of the primary signal, echo signal and combined signal further selecting one of the primary signal, echo signal and combined signal on a continuous basis during said demodulating the received signal.

16. A digital demodulator for demodulating a received radio frequency signal comprising:
  an echo signal canceller;
  a primary signal canceller;
  a signal combiner circuit coupled to said echo signal canceller and primary signal canceller;
  a first error correction circuit coupled to said echo signal canceller;
  a second error correction circuit coupled to said primary signal canceller;
  a third error correction circuit coupled to the signal combiner circuit; and
  a signal selector coupled to each of said first error correction circuit, second error correction circuit, and third error correction circuit.

17. The demodulator of claim 16, wherein the echo signal canceller is an equalizer which equalizes out echo properties of the received signal.

18. The demodulator of claim 16, wherein the primary signal canceller is an equalizer which equalizes out primary properties of the received signal.

19. The demodulator of claim 16, wherein the first error correction circuit is configured to perform a Reed-Solomon forward error correction operation on a primary signal received from the echo signal canceller.

20. The demodulator of claim 16, wherein the second error correction circuit is configured to perform a Reed-Solomon forward error correction operation on an echo signal received from the primary signal canceller.

21. The demodulator of claim 16, wherein the signal combiner circuit is configured to perform a bit-by-bit comparison and combination of a primary signal received from the echo signal canceller and an echo signal received from the primary signal canceller.

22. The demodulator of claim 16, wherein the signal selector is configured to select a preferred signal from a plurality of signals received from each of the first error correction circuit, second error correction circuit, and third error correction circuit.

23. The digital demodulator of claim 16, wherein the signal selector is configured to select from said first error correction circuit, second error correction circuit, and third error correction circuit on a continuous basis during demodulating the received radio frequency signal.

* * * * *